(12) United States Patent
Jang

(10) Patent No.: US 10,387,001 B2
(45) Date of Patent: Aug. 20, 2019

(54) METHOD OF ADJUSTING DISPLAY AREA OF ELECTRONIC BOOK CONTENTS

(71) Applicant: Jeong Hui Jang, Boryeong-si (KR)

(72) Inventor: Jeong Hui Jang, Boryeong-si (KR)

(*) Notice: Subject to any disclaimer, the term of this patent is extended or adjusted under 35 U.S.C. 154(b) by 156 days.

(21) Appl. No.: 15/287,977

(22) Filed: Oct. 7, 2016

(65) Prior Publication Data

US 2017/0205975 A1 Jul. 20, 2017

(30) Foreign Application Priority Data

Jan. 20, 2016 (KR) ........................ 10-2016-0006794

(51) Int. Cl.
| | |
|---|---|
| *G06F 3/0483* | (2013.01) |
| *G06F 3/0481* | (2013.01) |
| *G06F 3/0488* | (2013.01) |
| *G06F 17/21* | (2006.01) |
| *G06F 17/22* | (2006.01) |

(52) U.S. Cl.
CPC .......... *G06F 3/0483* (2013.01); *G06F 3/0481* (2013.01); *G06F 3/04883* (2013.01); *G06F 3/04886* (2013.01); *G06F 17/217* (2013.01); *G06F 17/218* (2013.01); *G06F 17/2229* (2013.01); *G06F 2203/04803* (2013.01); *G06F 2203/04808* (2013.01)

(58) Field of Classification Search
CPC ............... G06F 3/0483; G06F 3/04886; G06F 17/2229; G06F 17/217
USPC ........................................................ 715/863
See application file for complete search history.

(56) References Cited

U.S. PATENT DOCUMENTS

| | | | | |
|---|---|---|---|---|
| 4,709,348 | A | * 11/1987 | Horn | G06F 17/217 715/205 |
| 9,946,690 | B2 | * 4/2018 | Sesum | G06K 9/00463 |
| 2002/0186251 | A1 | * 12/2002 | Himmel | G06F 3/0485 715/784 |
| 2004/0207647 | A1 | * 10/2004 | Lundin | G06F 3/0485 345/672 |
| 2008/0040378 | A1 | * 2/2008 | Stefik | G06F 16/904 |
| 2012/0078612 | A1 | * 3/2012 | Kandekar | G06F 17/2745 704/9 |

(Continued)

FOREIGN PATENT DOCUMENTS

| | | |
|---|---|---|
| JP | 2007-140836 A | 6/2007 |
| JP | 2014-186577 A | 10/2014 |
| KR | 10-2014-0025048 A | 3/2014 |

*Primary Examiner* — Stephen S Hong
*Assistant Examiner* — Broderick C Anderson
(74) *Attorney, Agent, or Firm* — Patent Office of Dr. Chung Park

(57) ABSTRACT

Provided is a method of adjusting a display area of electronic book contents. The electronic book contents include tags that divide texts of the electronic book contents into sentence or paragraph units. The touch input of a user includes at least one of touch region, gesture type, and gesture direction. The processor wholly adjusts the display area of the electronic book contents such that a previous or next page is displayed in accordance with a first touch value, and partially adjusts the display area of the electronic book contents using the tags of the electronic book contents such that a sentence at an upper end or at a lower end or a paragraph including the sentence is fully displayed in accordance with a second touch value.

5 Claims, 18 Drawing Sheets

(56) References Cited

U.S. PATENT DOCUMENTS

| | | | |
|---|---|---|---|
| 2012/0233539 A1* | 9/2012 | Reed | G06F 3/0488 715/234 |
| 2015/0121206 A1* | 4/2015 | Odonoghue | G06F 17/24 715/256 |

* cited by examiner

[FIG. 1]
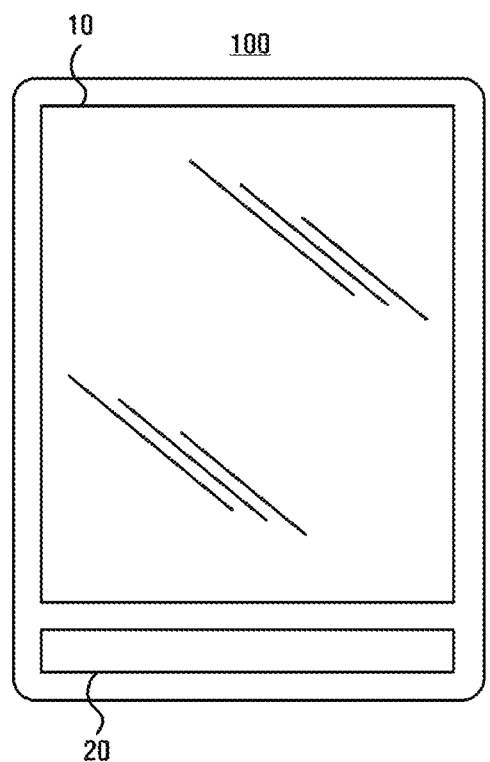

[FIG. 2]
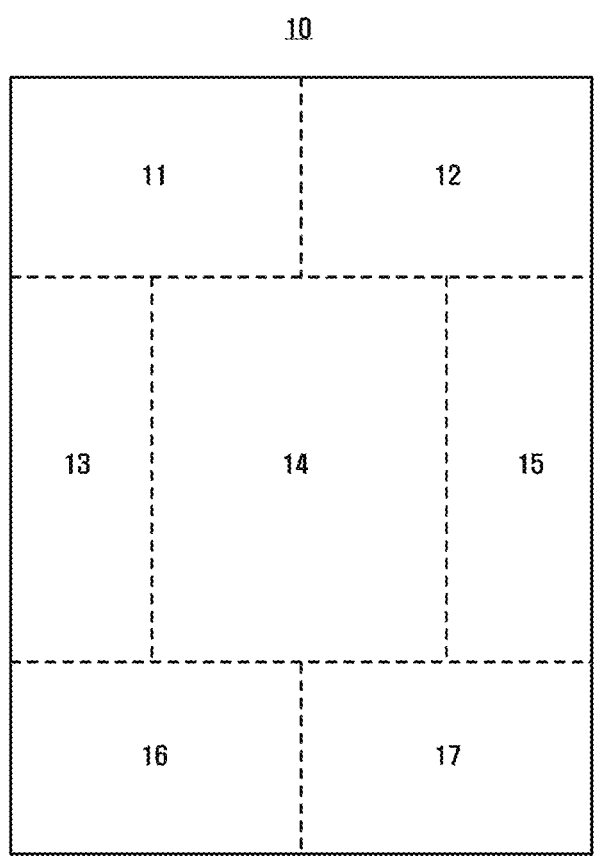

[FIG. 3]
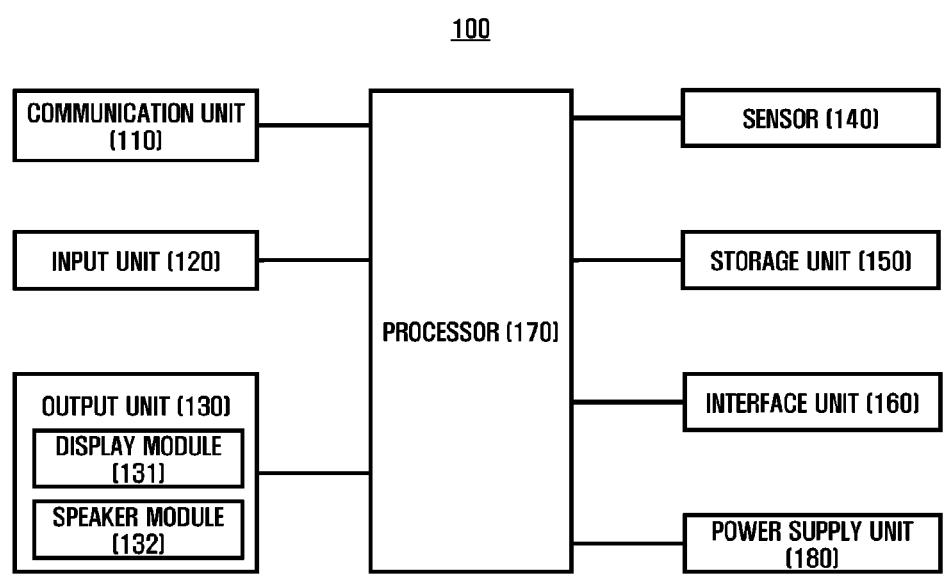

[FIG. 4]
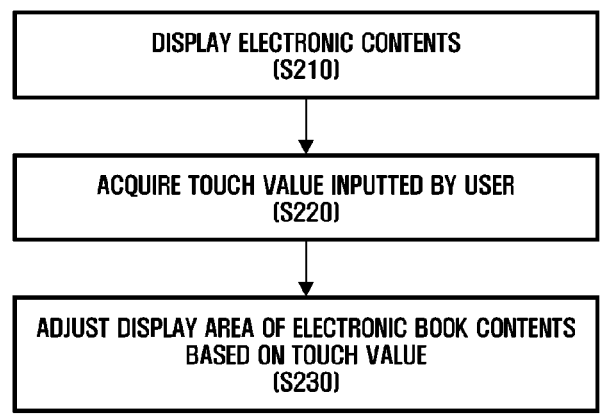

[FIG. 5]
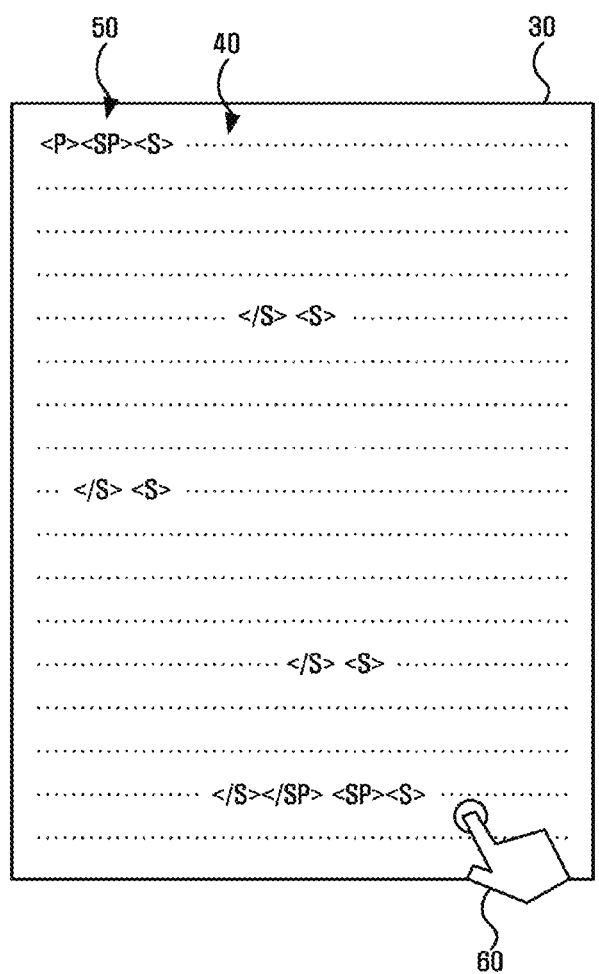

[FIG. 6]
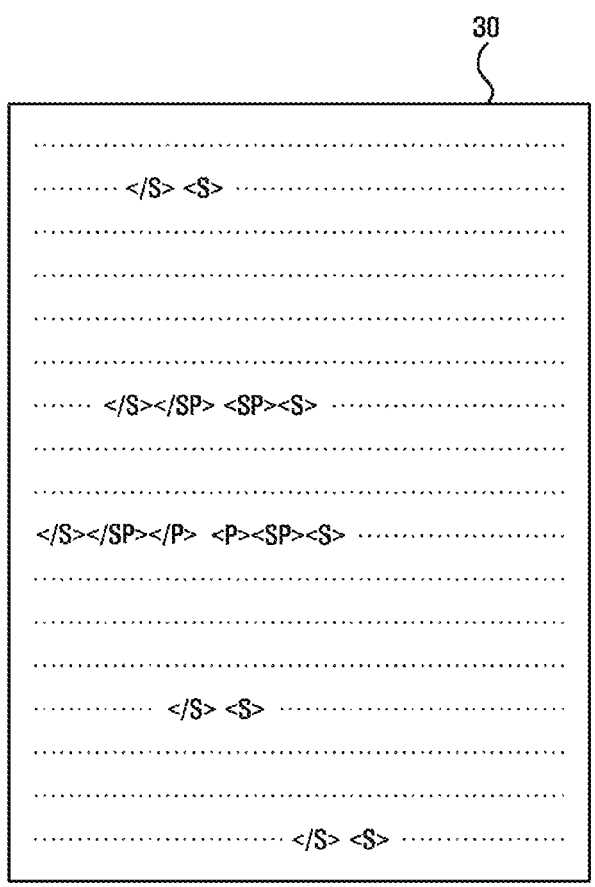

[FIG. 7]
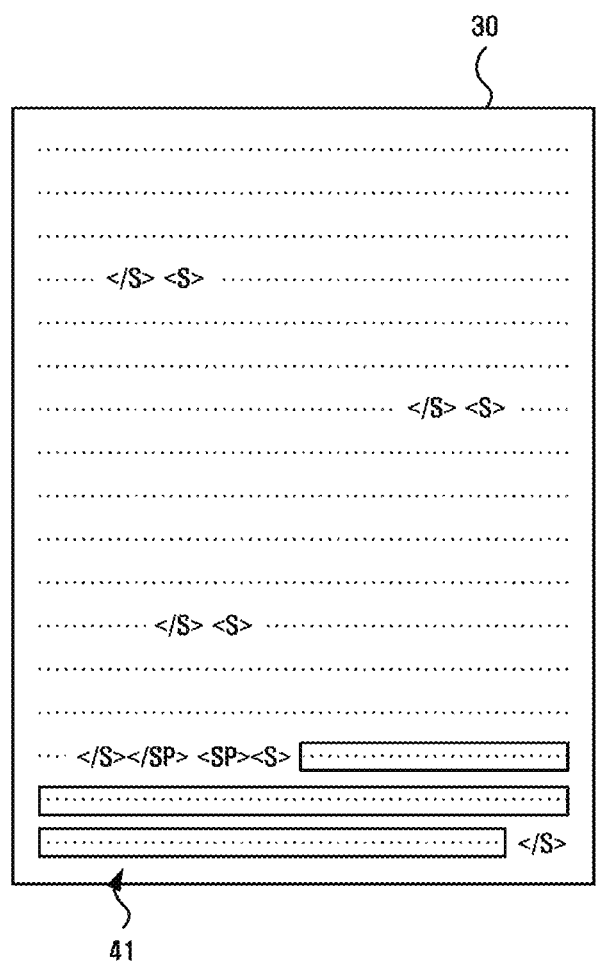

[FIG. 8]
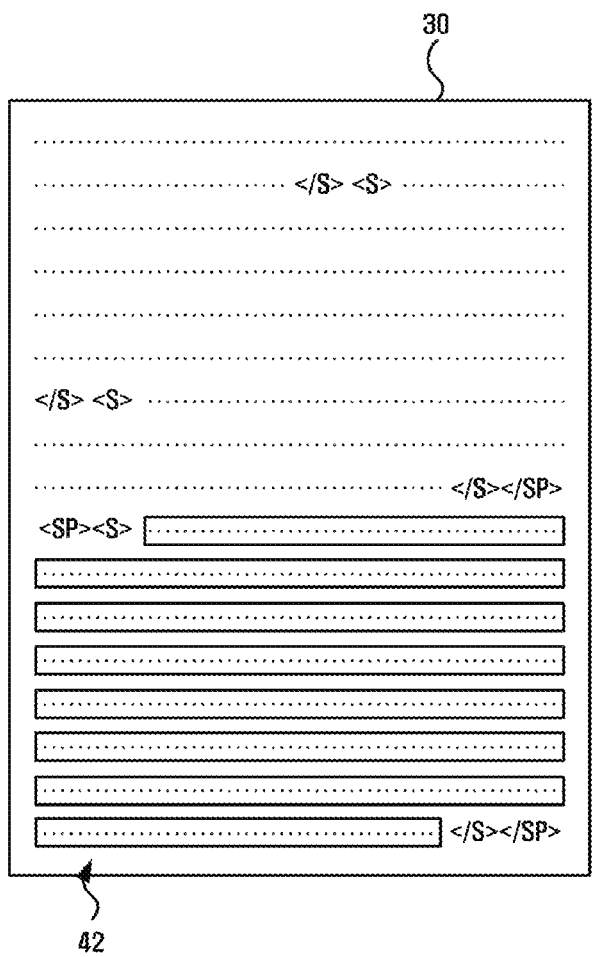

[FIG. 9]
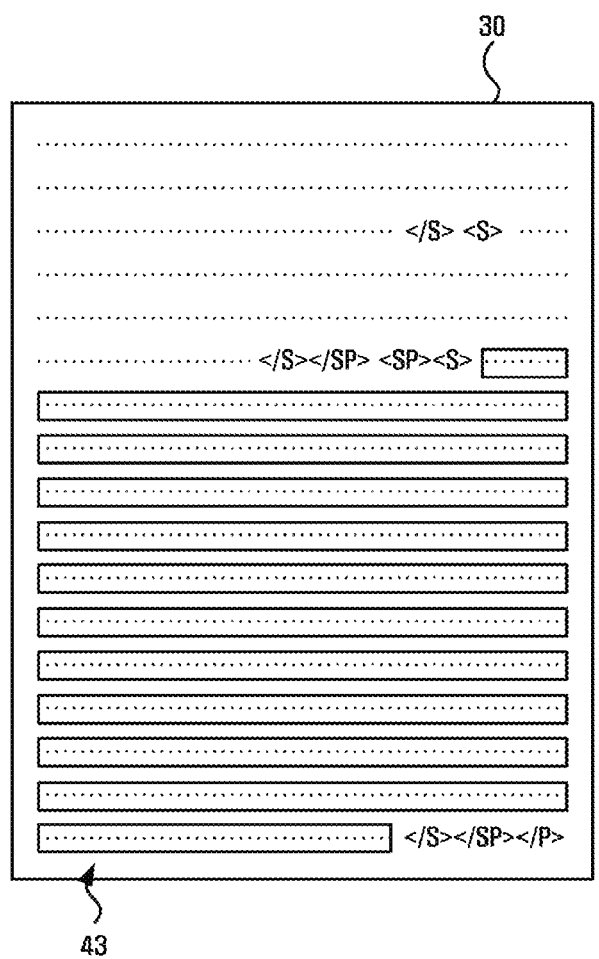

[FIG. 10]
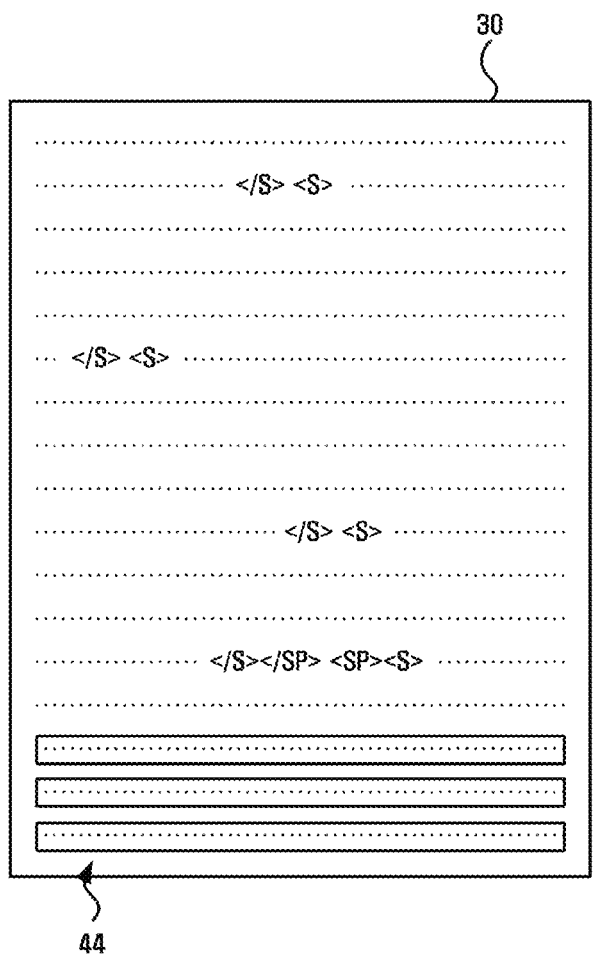

[FIG. 11]

| Area of Screen | Gesture Type | Direction | Adjustment Range | Apply |
|---|---|---|---|---|
| 2[12] ▼ | Two finger touch ▼ | Left | A sentence at the upper end is fully displayed ▼ | OK |
| 1[11] | Touch | | A sentence at the upper end is fully displayed | |
| 2[12] | Two finger touch | | A sentence at the lower end is fully displayed | |
| 3[13] | Press | | A paragraph having the sentence at the lowe | |
| 4[14] | Swipe | | A paragraph having the sentence at the uppe | |
| 5[15] | Two finger swipe | | Detailed paragraph having the sentence at th | |
| 6[16] | Drag | | 20% of the next page is displayed | |
| 7[17] | Pinch | | 40% of the next page is displayed | |

[FIG. 12]
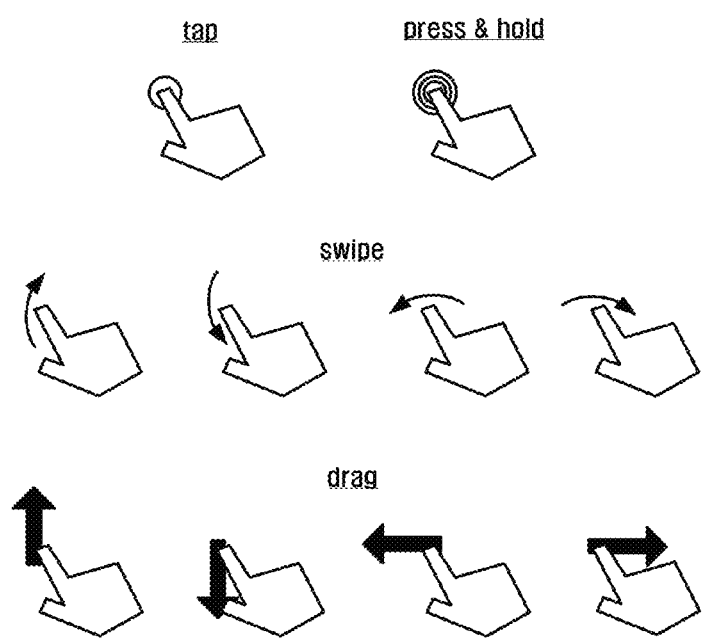

[FIG. 13]
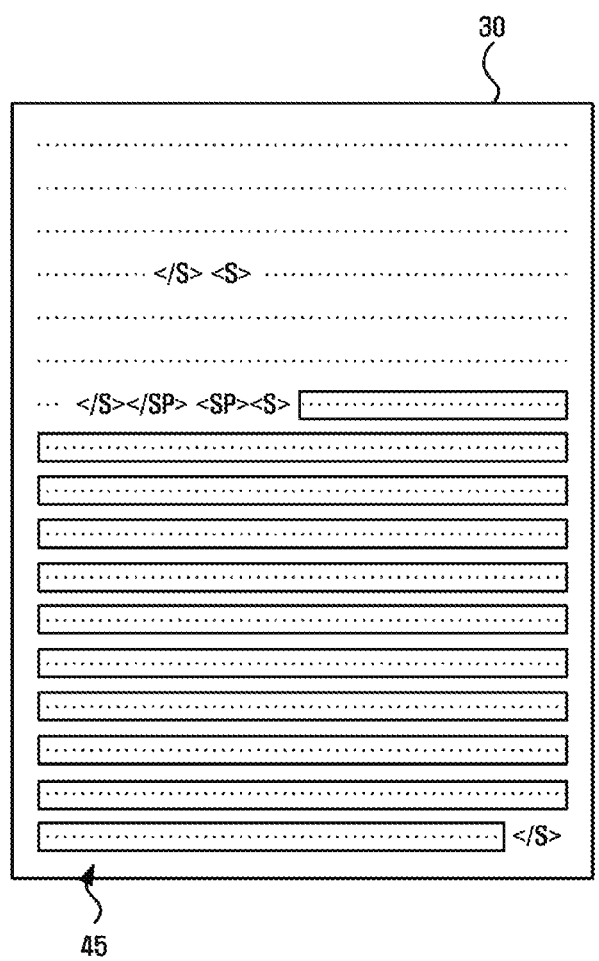

[FIG. 14]
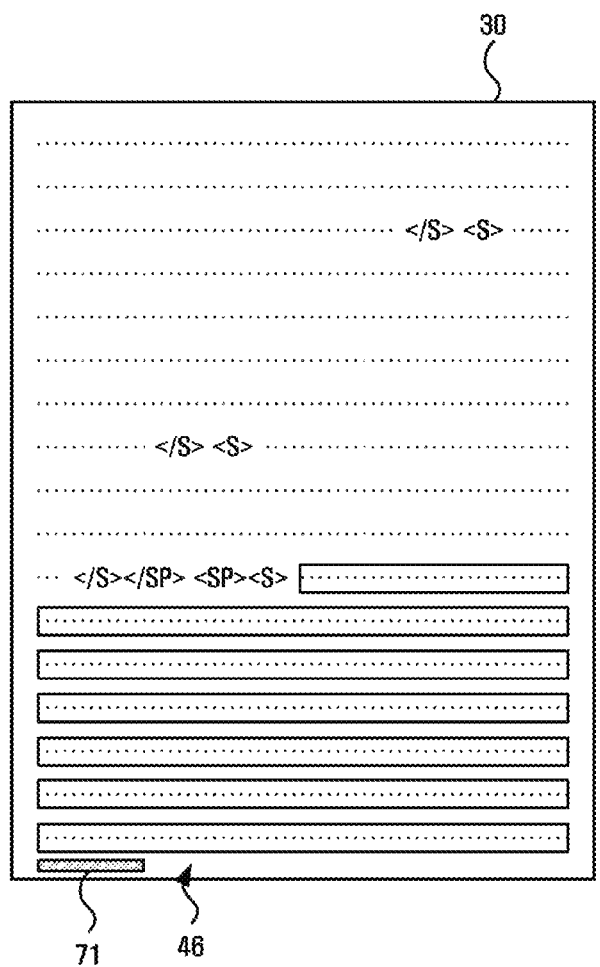

[FIG. 15]

| Partial Adjustment Limitation Ratio | Apply |
|---|---|
| a% ~ b% | OK |

[FIG. 16]
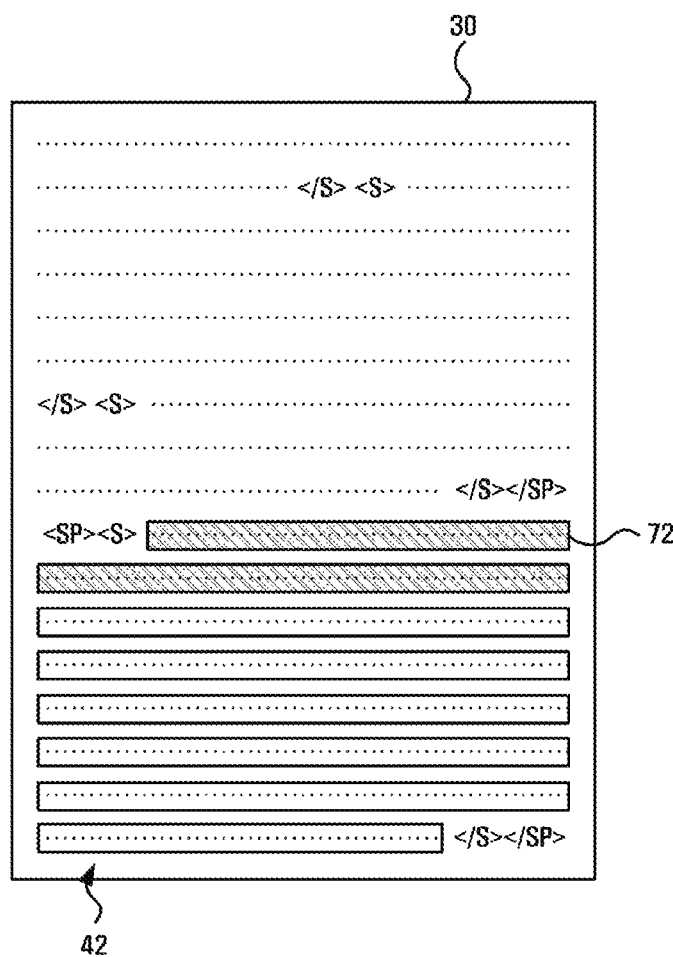

[FIG. 17]
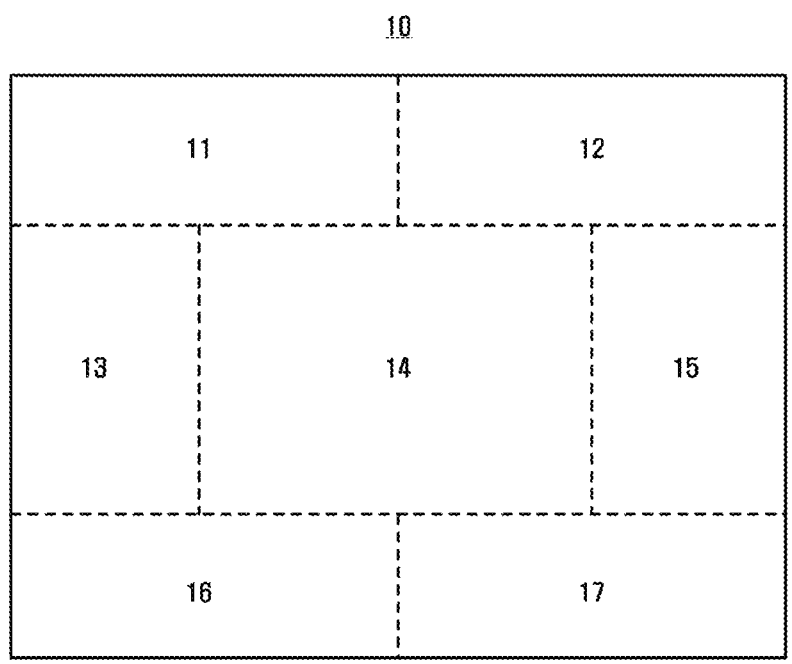

[FIG. 18]
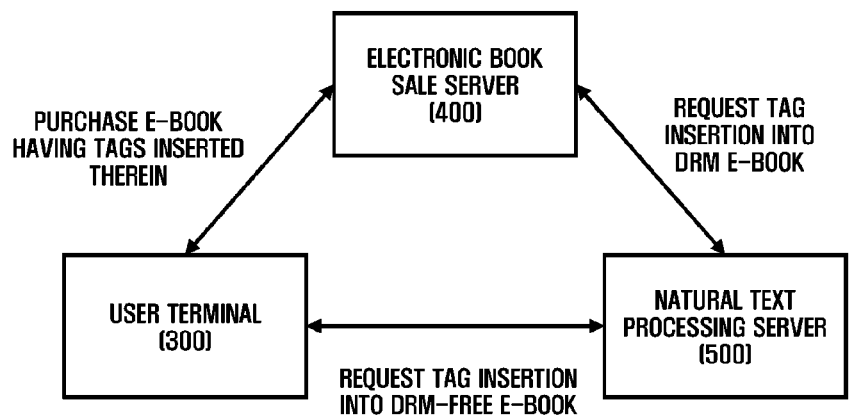

METHOD OF ADJUSTING DISPLAY AREA OF ELECTRONIC BOOK CONTENTS

CROSS-REFERENCE TO RELATED APPLICATIONS

This U.S. non-provisional patent application claims priority under 35 U.S.C. § 119 of Korean Patent Application No. 10-2016-0006794 filed on Jan. 20, 2016, the entire contents of which are hereby incorporated by reference.

BACKGROUND OF THE INVENTION

The present invention disclosed herein relates to a method and computing device of adjusting display area of electronic book contents.

Electronic books are work contents which were published or can be published into books and which can be recorded on electronic media or recorded in digital files to be distributed like typical books. Electronic books are manufactured using XML, HTML and XHTML which are Internet standard languages, and users can read electronic books through various kinds of computers, terminals or dedicated viewers. A Digital Rights Management (DRM) technology is also applied to some electronic book contents to prevent duplication thereof and grant only an authorized device or user access thereto.

These electronic books are divided into a fixed layout format and an automatic reflowable format. In case of fixed layout format, since the character size, font, illustration size and location are fixed on the page layout, there is inconvenience in that characters are also displayed in small sizes when the screen of an electronic book device is small. In case of automatic reflowable format, the number of characters included in one page, and the size and location of illustration can be automatically optimized and changed in accordance with the size of the screen of an electronic book device. However, even in case of automatic reflowable format, since the amount of text displayed on the screen of the electronic book device is similarly limited, a sentence or paragraph is frequently cut at the upper end or lower end of the screen, and thus the turning of pages is required to fully read one sentence or paragraph.

SUMMARY OF THE INVENTION

The present invention provides an electronic book device which allows a user to more simply and conveniently read electronic book contents.

The present invention also provides a method of adjusting a display area of electronic book contents and an application for performing the method, which allow a user to more simply and conveniently read electronic book contents.

Objectives to be achieved through the present invention are not limited to the above-mentioned objectives, and other objectives unmentioned will be understood by those skilled in the art from the following description.

Embodiments of the present invention provide computing devices including: a display for displaying electronic book contents; a sensor acquiring a touch value inputted by a user; and a processor adjusting a display area of electronic book contents based on the touch value, wherein: the electronic book contents include tags that divide texts of the electronic book contents into sentence or paragraph units; the touch value includes at least one of a touch region, a gesture type, and a gesture direction; and the processor wholly adjusts the display area of the electronic book contents such that a previous or next page is displayed in accordance with a first touch value, and partially adjusts the display area of the electronic book contents using the tags of the electronic book contents such that a sentence at an upper end or at a lower end or a paragraph including the sentence is fully displayed in accordance with a second touch value.

In some embodiments, the electronic book contents may further include tags that divide the texts of the electronic book contents into a detailed paragraph unit-sentences constituting the detailed paragraph have the same context or theme-, and the processor may partially adjust the display area of the electronic book contents using the tags of the electronic book contents such that a sentence at an upper end or at a lower end, a detailed paragraph including the sentence, or a paragraph including the sentence is fully displayed in accordance with a second touch value.

In other embodiments, the processor may partially adjust the display area of the electronic book contents such that a predetermined amount of a previous or next page are displayed in accordance with a third touch value.

In still other embodiments, a limited amount of the partial adjustment of the display area of the electronic book contents may be preset, and when the processor partially adjusts the display area of the electronic book contents such that the sentence at the upper end or at the lower end or the paragraph including the sentence is fully displayed and when an adjustment amount of the display area of the electronic book contents is larger than the limited amount, the processor may partially adjust the display area of the electronic contents such that the limited amount of the previous or next page is displayed.

In even other embodiments, the display may display an indicator indicating that the partial adjustment of the display area of the electronic book contents is limited.

In yet other embodiments, when the display area of the electronic book contents is partially adjusted using the tags of the electronic book contents such that a sentence including a sentence at an upper end or at a lower end is fully displayed, the display may emphasize the sentence so as to distinguish the sentence from other sentences.

In other embodiments of the present invention, computing devices include: a display for displaying electronic book contents; a sensor acquiring a touch value inputted by a user; and a processor adjusting a display area of electronic book contents based on the touch value, wherein: the electronic book contents include tags that divide texts of the electronic book contents into sentence or paragraph units; the touch value includes at least one of a touch region, a gesture type, and a gesture direction; and the processor adjusts the display area of the electronic book contents by unit of page in accordance with a first touch value, and adjusts the display area of the electronic book contents by unit of sentence or paragraph in accordance with a second touch value.

In still other embodiments of the present invention, methods of adjusting a display area of electronic book contents, which is performed by a computing device, include: displaying the electronic book contents; acquiring a touch value inputted by a user; and adjusting the display area of the electronic book contents based on the touch value, wherein: the electronic book contents include tags that divide texts of the electronic book contents into sentence or paragraph units; the touch value includes at least one of a touch region, a gesture type, and a gesture direction; and the adjusting of the display area of the electronic book contents includes: wholly adjusting the display area of the electronic book contents such that a previous or next page is displayed in accordance with a first touch value; and partially adjusting the display area of the electronic book contents using the tags of the electronic book contents such that a sentence at an upper end or at a lower end or a paragraph including the sentence is fully displayed in accordance with a second touch value.

In even other embodiments of the present invention, methods of adjusting a display area of electronic book contents, which is performed by a computing device, include: displaying the electronic book contents; acquiring a touch value inputted by a user; and adjusting the display area of the electronic book contents based on the touch value, wherein: the electronic book contents include tags that divide texts of the electronic book contents into sentence or paragraph units; the touch value includes at least one of a touch region, a gesture type, and a gesture direction; and the adjusting of the display area of the electronic book contents includes: adjusting the display area of the electronic book contents by unit of page in accordance with a first touch value; and adjusting the display area of the electronic book contents by unit of sentence or paragraph in accordance with a second touch value.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 1 is a schematic view illustrating the exterior of an electronic book device according to an embodiment of the present invention;

FIG. 2 is a schematic view illustrating the area of a screen of an electric book device of FIG. 1;

FIG. 3 is a block view illustrating a configuration of an electric book device of FIG. 1;

FIG. 4 is a flowchart illustrating a method of adjusting a display area of electronic book contents according to an embodiment of the present invention;

FIG. 5 is a schematic view illustrating a display area of electronic book contents;

FIG. 6 is a schematic view illustrating a display area of electronic book contents which is adjusted on the whole;

FIGS. 7 to 10 are schematic views illustrating display areas of electronic book contents which are partially adjusted;

FIG. 11 is a schematic view illustrating a preset adjustment range of a display area of electronic book contents;

FIG. 12 is a schematic view illustrating gesture types used to divide the adjustment range of a display area of electronic book contents;

FIG. 13 is a schematic view illustrating a display area of electronic book contents which is excessively and partially adjusted;

FIG. 14 is a schematic view illustrating a partial adjustment of a display area of electronic book contents which is limited;

FIG. 15 is a schematic view illustrating a limited amount of a partial adjustment of a display area of electronic book contents which is preset;

FIG. 16 is a schematic view illustrating a reference sentence of a partial adjustment of a display area of electronic book contents which is emphasized;

FIG. 17 is a schematic view illustrating another modified example of the area of a screen of an electric book device of FIG. 1; and FIG. 18 is a schematic view illustrating a system of inserting a tag into an electronic book.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

In the drawings, the dimensions of layers and regions are exaggerated for clarity of illustration. It will also be understood that when a layer (or film) is referred to as being 'on' another layer or substrate, it can be directly on the other layer or substrate, or intervening layers may also be present. Further, it will be understood that when a layer is referred to as being 'under' another layer, it can be directly under, and one or more intervening layers may also be present. In addition, it will also be understood that when a layer is referred to as being 'between' two layers, it can be the only layer between the two layers, or one or more intervening layers may also be present. Like reference numerals refer to like elements throughout.

Hereinafter, it will be described about an exemplary embodiment of the present invention in conjunction with the accompanying drawings.

FIG. 1 is a schematic view illustrating the exterior of an electronic book device according to an embodiment of the present invention.

Referring to FIG. 1 an electronic book device 100 may display electronic book contents on a display area 10.

For example, electronic book contents may include texts (or writing) and/or illustrations. Also, electronic book contents may further include tags which divide texts into certain units as described later. However, the present invention is not limited thereto, and unlike typical books, electronic book contents may further include any contents such as photographs, pictures, tables, graphs, voices, sounds, and images which are not exemplified.

The electronic book device 100 may include a panel 20 for manipulation of a user such as movement to the previous or next page, movement to the first or last page, or movement to a specific page. The panel 20 may include a key, a button, a switch, or a jog wheel, or may be provided in a form of a touchscreen as described later.

The electronic book device 100 may be a computing device for displaying electronic book contents on the display area 10, and the type of the electronic book device 100 may be a personal computer, a laptop computer, a smartphone, a tablet computer, or other E-book dedicated viewer terminals.

FIG. 2 is a schematic view illustrating the display area of an electric book device of FIG. 1.

Referring to FIG. 2, the display area 10 of the electronic book device 100 may be divided into a plurality of regions 11, 12, 13, 14, 15, 16 and 17. For example, the display area 10 of the electronic book device 100 may be divided into upper parts 11 and 12, middle parts 13, 14 and 15, and lower parts 16 and 17. The upper parts 11 and 12 may be divided into a left side 11 and a right side 12, and the middle parts 13, 14 and 15 may be a left side 13, a center 14 and a right side 15. Also, the lower parts 16 and 17 may be divided into a left side 16 and a right side 17. However, the present invention is not limited thereto, and the display area 10 of the electronic book device 100 may be variously divided into a plurality of regions according to embodiments.

FIG. 3 is a block view illustrating a configuration of an electric book device of FIG. 1.

Referring to FIG. 3, the electronic book device 100 may include a communication unit 110, an input unit 120, an output unit 130, a sensor 140, a storage unit 150, an interface unit 160, a processor 170, and a power supply unit 180.

The communication unit 110 may be a communication adaptor for communicating with an external device wiredly and/or wirelessly. The communication unit 110 may wirelessly communicating with an external device using various communication methods such as WiFi, Bluetooth, Zigbee, Ultra-Wide Band (UWB) communication, ultrasonic wave, and Infrared Ray (IR). The communication unit 110 may deliver data and/or information received from an external device to a processor 170, and may transmit data and/or information delivered from the processor 170 to an external device.

The input unit 120 may be an input device receiving various kinds of information from a user. For example, the input unit 120 may include an input unit such as a key, a button, a switch, a touchpad, and a jog wheel. When a touchpad forms a mutual layered structure with a display module 131 described later, the touchpad may form a touchscreen.

The output unit 130 may be an output device for outputting various kinds of information to a user. The output unit 130 may output texts, images, voices, sounds, images or other various types of information. To this end, the output unit 130 may include a display module 131 and a speaker module 132. For example, the display module 132 may include Plasma Display Panel (PDP), Liquid Crystal Display (LCD), Thin Film Transistor (TFT) LCD, Organic Light Emitting Diode (OLED), flexible display, three dimensional display, electronic ink display, or any forms which are well-known in this art. The output unit 130 may be configured to further include any form of output units which are not mentioned.

A portion of the display module 131 exposed to the outside may correspond to the display area 10.

The sensor 140 may sense the state of a user or the state of the electronic book device 100. For example, the sensor 140 may include sensing units such as a touch sensor, a proximity sensor, a pressure sensor, a vibration sensor, a geomagnetic sensor, a gyro sensor, an acceleration sensor, and a biometric sensor. The sensor 140 may also be used for the user's input.

The storage unit 150 may store various kinds of data and commands. The storage unit 150 may also store various kinds of software modules which include system software for operating the electronic book device 100 and applications for performing the method of adjusting the display area of electronic book contents according to embodiments of the present invention. For example, the storage unit 150 may include recording devices such as Random Access Memory (RAM), Read Only Memory (ROM), Erasable Programmable ROM (EPROM), Electrically EPROM (EEPROM), flash memory, and hard disk.

The interface unit 160 may serve as a passage to an external device connected to the electronic book device 100. The interface unit 160 may receive data and/or information or power from an external device, or may deliver data and/or information or power to internal components. Also, the interface unit 160 may transmit data and/or information inside the electronic book device 100 to an external device, or may provide power for an external device. For example, the interface unit 160 may include a wired/wireless headset port, a charging port, a wired/wireless data port, a memory card port, a Universal Serial Bus (USB) port, an audio Input/Output (I/O) port, and a video Input/output (I/O) port.

The processor 170 may control other components to control overall operations of the electronic book device 100. The processor 170 may perform various kinds of software modules stored in the storage unit 150, which include system software and applications for performing the method of adjusting the display area of electronic book contents according to embodiments of the present invention.

The power supply unit 180 may supply power necessary for the operations of communication unit 110, the input unit 120, the output unit 130, the sensor 140, the storage unit 150, the interface unit 160, and the processor 170. The power supply unit 180 may include an internal battery.

Since the components shown in FIG. 3 are not essential, the electronic book device 100 may further include any components which are not shown in the drawing according to embodiments of the present invention, or may be modified so as to omit a part of components shown in the drawing.

FIG. 4 is a flowchart illustrating a method of adjusting a display area of electronic book contents according to an embodiment of the present invention. Hereinafter, a method of adjusting a display area of electronic book contents will be described using the components of the electronic book 100 of FIG. 3.

Referring to FIG. 4, in operation S210, the output unit 130 may display electronic book contents. As described above, texts and/or illustrations of electronic book contents may be displayed on the display area 10.

Next, in operation S220, the sensor 140 may acquire a touch value inputted by a user. Here, the touch value may include a touch coordinate and/or a touch area. The touch area include in the touch value may represent one of areas 11, 12, 13, 14, 15, 16 and 17 of the display area 10 which are described with reference to FIG. 2. Also, when the touch of a user is inputted in a form of gesture such as swipe and drag, the touch value may further include the gesture type and/or gesture direction (up, down, left, and right).

Next, in operation S230, the processor 170 may adjust the display area of electronic book contents on the basis of the touch value. Here, the display area of electronic book contents may represent a partial area of the whole display area 10 of electronic book contents. According to embodiments of the present invention, the display area of electronic book contents may be adjusted by unit of page or by unit of sentence or paragraph. The adjusting of the display area by unit of page may represent wholly adjusting the display area of electronic book contents such that a previous or next page is displayed. Also, the adjusting of the display area by unit of sentence or paragraph may represent partially adjusting the display area of electronic book contents such that one or more previous or next sentences or one or more previous or next paragraphs are (fully) displayed. In this case, electronic book contents displayed on the display area 10 may be shifted by unit of character. To this end, tags described later may be used.

The method of adjusting the display area of electronic book contents according to an embodiment of the present invention may be applied to an electronic book of an automatic reflowable format. However, the present invention is not limited thereto, and it may be clear to those skilled in the art that the method can be applied to any format of electronic books in which the number of characters included in one page is adjustable in accordance with the size of the screen of the electronic book device 100.

FIG. 5 is a schematic view illustrating a display area of electronic book contents.

Referring to FIG. 5, a portion of texts of electronic book contents, i.e., only text 40 inside the display area 30 of electronic book contents may be displayed on the display area 10.

Electronic book contents may include tags 50 which divide texts by unit of sentence, detailed paragraph, and paragraph. In regard to the relationship among sentence, detailed paragraph, and paragraph, the paragraph may include at least one detailed paragraph, and the detailed paragraph may include at least one sentence. In this disclosure, the tags 50, "<P>" and "<P/>" indicate the start and the end of a paragraph, respectively. Also, the tags 50 "<SP>" and "</SP>" indicate the start and the end of a detailed paragraph, and the tags 50 "<S>" and "</S>" indicate the start and the end of a sentence. The tags 50 may be used just to divide texts of electronic book contents into sentence, detailed paragraph and paragraph units, and are not displayed on the display area 10.

The display area 30 of electronic book contents may be adjusted by a touch 60 inputted by a user. A user may adjust the display area 30 of electronic book contents using a finger, an electronic pen, or any touch input unit.

FIG. 6 is a schematic view illustrating a display area of electronic book contents which is adjusted on the whole.

Referring to FIG. 6, compared to FIG. 5, the display area 30 of electronic book contents may be wholly adjusted so as to display a next page. As described above, since the present invention can be applied to an automatic reflowable format of electronic books, the size of page may vary with the types and specifications of the electronic book device 100. That is, the same amount of electronic book contents may be divided into a first number of pages in a first electronic book device, and may be divided into a second number of pages in a second electronic book device. The size of page may also be changed in accordance with the presetting of a user.

Even when the previous page is displayed, the display area 30 of electronic book contents may be wholly adjusted into the substantially same.

FIGS. 7 to 10 are schematic views illustrating display areas of electronic book contents which are partially adjusted.

Referring to FIG. 7, compared to FIG. 5, the display area 30 of electronic book contents may be partially adjusted such that a sentence (partially cut sentence) at a lower end of page is fully displayed. The reference numeral "41" may represent a sentence which is fully displayed while a portion of sentence that is not displayed in FIG. 5 is shifted by the partial adjustment of the display area 30 of electronic book contents.

Referring to FIG. 8, compared to FIG. 5, the display area 30 of electronic book contents may be partially adjusted such that a detailed paragraph including sentences (partially cut sentence or complete sentence) at a lower end of page is fully displayed. The reference numeral "42" may represent a detailed paragraph which is fully displayed while a portion of the detailed paragraph that is not partially displayed in FIG. 5 is shifted by the partial adjustment of the display area 30 of electronic book contents.

Referring to FIG. 9, compared to FIG. 5, the display area 30 of electronic book contents may be partially adjusted such that a paragraph including sentences (partially cut sentence or complete sentence) at a lower end of page is fully displayed. The reference numeral "43" may represent a paragraph which is fully displayed while a portion of the paragraph that is not partially displayed in FIG. 5 is shifted by the partial adjustment of the display area 30 of electronic book contents.

Even when the sentence, detailed paragraph, or paragraph at the upper end of page are fully displayed, the display area 30 of electronic book contents may be partially adjusted into the substantially same.

Referring to FIG. 10, compared to FIG. 5, the display area 30 of electronic book contents may be partially adjusted such that a preset number (e.g., three) of lines of the next page are displayed. The reference numeral "44" may represent a portion of the next page displayed on the display area 10 by the partial adjustment of the display area 30 of electronic book contents. The ratio with respect to one page may also be set instead of the number of lines. As described later, different numbers of lines may also be set for each touch region, gesture type, and gesture direction. In this case, tags may not be used.

Even when a preset number of lines of the previous page are displayed, the display area 30 of electronic book contents may be partially adjusted into the substantially same.

FIG. 11 is a schematic view illustrating a preset adjustment range of a display area of electronic book contents.

Referring to FIG. 11, a user may set the adjustment range of the display are of electronic book contents by mapping at least one area 11, 12, 13, 14, 15, 16 and 17, at least one gesture type, and at least one gesture direction which are described with reference to FIG. 2. For example, the middle parts 13, 14 and 15 of the plurality of areas of the display area 10 may be set to an area for wholly adjusting the display area of electronic book contents, and the upper parts 11 and 12 an the lower parts 16 and 17 may be set to areas for partially adjusting the display area of the electronic book contents. When the left side 13 of the middle parts 13, 14 and 15 is selected, the previous page may be displayed. Also, when the right side 15 is selected, the next page may be displayed. The center 14 of the middle parts 13, 14 and 15 may be an area for various settings or function selection. When the upper parts 11 and 12 are selected, a sentence, a detailed paragraph, or a paragraph at the upper end may be fully displayed. Also, when the lower parts 16 and 17 are selected, a sentence, a detailed paragraph, or a paragraph at the lower end may be fully displayed. The detailed adjustment range may be divided by whether the touch region is the left sides 11 and 16 or the right sides 12 and 17, and by the gesture type and the gesture direction. A plurality of touch regions, a plurality of gesture types and/or a plurality of gesture directions may be set for the same function.

FIG. 12 is a schematic view illustrating gesture types used to divide the adjustment range of a display area of electronic book contents.

In FIG. 12, although only tap, press and hold, swipe, and drag are shown, the present invention is not limited thereto, and any other gestures which are not illustrated may be used to distinguish the adjustment range of the display area of electronic book contents.

FIG. 13 is a schematic view illustrating a display area of electronic book contents which is excessively and partially adjusted, and FIG. 14 is a schematic view illustrating a partial adjustment of a display area of electronic book contents which is limited.

Referring to FIG. 13, compared to FIG. 5, the display area 30 of electronic book contents may be partially adjusted such that a sentence at a lower end of page is fully displayed. The reference numeral "45" may represent a sentence which is fully displayed while a portion of sentence that is not displayed in FIG. 5 is shifted by the partial adjustment of the display area 30 of electronic book contents. However, unlike FIG. 7, the adjusted amount of the display area of electronic book contents may be excessively large (50% or more of the display area 10 is adjusted. In the worst case, one sentence may exceed one page).

Referring to FIG. 14, compared to FIG. 13, the partial adjustment of the display area 30 of electronic book contents may be limited, and thus the sentence at the lower end may not be fully displayed. The reference numeral "46" may represent a sentence which is not fully displayed even though another portion of the sentence is further displayed while a portion of the sentence is shifted by the partial adjustment of the display area 30 of electronic book contents. When the display area 30 of electronic book contents is partially adjusted such that the whole of the sentence is fully displayed and when the adjusted amount of the display area 30 of electronic book contents is larger than the limited amount, the partial adjustment of the display area 30 of electronic book contents may be limited. Also, the display area 30 of electronic book contents may be adjusted so as to display as much as the limited amount of the next page. In this case, an indicator 71 indicating that the partial adjustment of the display area 30 of electronic book contents has been limited may be together displayed on the display area 10. The indicator 71 may be displayed in character, symbol, figure, graph or any other forms. The indicator 71 may not be further displayed after the lapse of preset time.

This can also be substantially equally applied to a case where the display area 30 of electronic book contents is partially adjusted by unit of detailed paragraph or paragraph as well as by unit of sentence.

FIG. 15 is a schematic view illustrating a limited amount of a partial adjustment of a display area of electronic book contents which is preset.

A user may set the limited amount of the partial adjustment of the display area of electronic book contents by inputting a specific ratio or selecting a specific ratio within a preset range.

FIG. 16 is a schematic view illustrating a reference sentence of a partial adjustment of a display area of electronic book contents which is emphasized.

Referring to FIG. 16, after or at the same time when the display area 30 of electronic book contents is partially adjusted, a reference sentence 72 may be highlighted to be distinguished from other sentences. Thus, a user can easily know the adjustment amount of the display area 30 of electronic book contents. For this emphasis, the reference sentence 72 may differ from other sentences in font, character size, character thickness, underline, character color, highlight expression, and shade, but the present invention is not limited thereto. The reference sentence 72 may not be further emphasized after the lapse of preset time.

This can be applied to a case where the display area 30 of electronic book contents is partially adjusted by unit of detailed paragraph or paragraph except unit of sentence.

FIG. 17 is a schematic view illustrating another modified example of the area of a screen of an electric book device of FIG. 1.

Referring to FIG. 17, when the display area 10 is switched from portrait view to landscape view as the electronic book device 100 rotates, the division of the areas 11, 12, 13, 14, 15, 16 and 17 of the display area 10 may be changed as shown in FIG. 17. Also in a case of landscape view, the basic screen setting of the electronic book device 100 may be the same as portrait view.

FIG. 18 is a schematic view illustrating a system of inserting a tag into an electronic book.

Referring to FIG. 18, a system may include a user terminal 300, an electronic book sale server 400, and a natural language text processing server 500. The user terminal 300, the electronic book sale server 400, and the natural language text processing server 500 may transmit and receive data and/or information to/from each other.

The user terminal 300 may represent a computer system used by a user. For example, the user terminal 300 may be a computer system such as smartphone, tablet, Personal Digital Assistant (PDA), laptop, and desktop, but the present invention is not limited thereto. Also, the user terminal 300 may be other unmentioned computer systems which are available for on-line service.

A user may purchase an electronic book from the electronic book sale server 400 using the user terminal 300, and in this case, may optionally purchase an electronic book into which the tags described above are not inserted. When a user purchases an electronic book without tags and the electronic book is a Digital Rights Management (DRM)-free electronic book, a user may request tag insertion from the natural language text processing server 500 using the user terminal 300. In regard to a DRM electronic book, the electronic book sale server 400 may request tag insertion from the natural language text processing server 500. The natural language text processing server 500 may analyze texts of an electronic book, may detect boundaries of sentences, detailed paragraphs, and paragraphs, and may insert tags described above into the start and the end thereof. Since a description of natural language text processing methodologies and detail algorithms thereof may obscure the essentials of present invention, the detailed description thereof will be omitted herein.

Meanwhile, the tags may also be inserted without a computer system by a user using indent, paragraph separators, line separators, line feed, and carriage return. For this, an editor may also be mounted onto the electronic book device 100 or the user terminal 300 to insert tags. Alternatively, a weight-lightened natural language text processing engine may also be mounted onto the electronic book device 100 or the user terminal 300.

According to an electronic book device of the present invention, when there is a sentence, a detailed paragraph, or a paragraph which is cut at an upper end or lower end due to shortage of the screen area, touch values inputted by a user are distinguished from each other, and thus the display area of electronic book contents is not wholly adjusted but is partially adjusted such that the cut sentence, detailed paragraph or paragraph can be fully displayed. Thus, a user can more simply and conveniently read the electronic book contents.

According to a method of adjusting a display area of electronic book contents and an application for performing the method, when there is a sentence, a detailed paragraph, or a paragraph which is cut at an upper end or lower end due to shortage of the screen area, touch values inputted by a user are distinguished from each other, and thus the display area of electronic book contents is not wholly adjusted but is partially adjusted such that the cut sentence, detailed paragraph or paragraph can be fully displayed. Thus, a user can more simply and conveniently read the electronic book contents.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computing device comprising:
a display for displaying electronic book contents;
a sensor for acquiring a touch value inputted by a user; and
a processor for adjusting a display area of electronic book contents based on the touch value,
wherein:
the electronic book contents comprise tags that divide texts of the electronic book contents into sentences or detailed paragraphs on a basis of analysis of natural language text processing, wherein each of the detailed paragraphs comprises one or more sentences that have a same context or theme;
the touch value comprises information of at least one of a touch region, a gesture type, and a gesture direction; and
the processor adjusts the display area of the electronic book contents such that a previous or next page is displayed in accordance with a first touch value, and makes a partial adjustment of the display area of the electronic book contents using the tags of the electronic book contents such that a sentence at an upper end or at a lower end of a page or a detailed paragraph comprising the sentence is displayed on the display in accordance with a second touch value, and
wherein, if an amount of the partial adjustment is larger than a preset limited amount, the processor partially adjusts the display area of the electronic contents such that the preset limited amount of the previous or next page is displayed on the page, and, otherwise, the processor partially adjusts the display area of the electronic book contents such that an entire portion of the sentence or an entire portion of the detailed paragraph comprising the sentence is displayed on the page of the display.

2. The computing device of claim 1, wherein the processor partially adjusts the display area of the electronic book contents such that a predetermined amount of a previous or next page is displayed on the page in accordance with a third touch value.

3. The computing device of claim 1, wherein the display displays an indicator indicating that the partial adjustment of the display area of the electronic book contents is limited to the preset limited amount.

4. The computing device of claim 1, wherein the sentence displayed on the display area is emphasized so as to be distinguished from other sentences.

5. A computer-implemented method of adjusting a display area of electronic book contents, the method comprising:
displaying the electronic book contents on a screen;
acquiring a touch value inputted by a user; and
adjusting the display area of the electronic book contents based on the touch value,
wherein:
the electronic book contents comprise tags that divide texts of the electronic book contents into sentences or detailed paragraphs on a basis of analysis of natural language text processing, wherein each of the detailed paragraphs comprises one or more sentences that have a same context or theme;
the touch value comprises information of at least one of a touch region, a gesture type, and a gesture direction; and
the step of adjusting of the display area of the electronic book contents comprises:
wholly adjusting the display area of the electronic book contents such that a previous or next page is displayed in accordance with a first touch value; and
making a partial adjustment of the display area of the electronic book contents using the tags of the electronic book contents such that a sentence at an upper end or at a lower end of a page or a detailed paragraph comprising the sentence is displayed on the screen in accordance with a second touch value, the step of making a partial adjustment including:
if an amount of the partial adjustment is larger than a preset limited amount, partially adjusting the display area of the electronic contents such that the preset limited amount of the previous or next page is displayed on the page; and
otherwise, partially adjusting the display area of the electronic book contents such that an entire portion of the sentence or an entire portion of the detailed paragraph comprising the sentence is displayed on the page of the display.

* * * * *